No. 665,053. Patented Jan. 1, 1901.
W. C. BERRY.
NUT LOCK.
(Application filed June 23, 1900.)

(No Model.)

Witnesses

Inventor
Walton C. Berry,
by O'Meara & Co.
Attorneys

UNITED STATES PATENT OFFICE.

WALTON CHAPPEL BERRY, OF ROME, GEORGIA, ASSIGNOR OF ONE-HALF TO J. M. VANDIVER, OF SAME PLACE.

NUT-LOCK.

SPECIFICATION forming part of Letters Patent No. 665,053, dated January 1, 1901.

Application filed June 23, 1900. Serial No. 21,324. (No model.)

*To all whom it may concern:*

Be it known that I, WALTON CHAPPEL BERRY, a citizen of the United States, residing at Rome, in the county of Floyd and State of Georgia, have invented a new and useful construction of Nut-Lock, of which the following is a specification.

My invention is an improved construction of nut-lock adapted for securing the nuts upon bolts used in connection with rail-joints; but it will of course be understood that my invention can be applied to other constructions wherein it is desired to securely fasten the nut upon its bolt and prevent accidental displacement by jarring or otherwise.

Another object of the invention is to provide a highly efficient nut-lock which shall consist of few parts and which can be easily assembled into operative positions; and with these objects in view the invention consists in providing a washer with means for rigidly connecting it to the fish-plate and having its aperture formed with a series of ratchet-teeth adapted to be engaged by one end of a split ring located within the washer, the bolt being adapted to pass through the said washer and split ring, said split ring having projections extending beyond the face of the washer and adapted to engage recesses produced in the inner faces of the nut, so that the nut and ring will move together, and in this manner the nut will be securely held against any rearward movement, as it will be impossible for the ring to move, and likewise the washer.

The invention consists also in certain details of construction and novelties of combination, all of which will be fully described hereinafter and pointed out in the claims.

Figure 1:
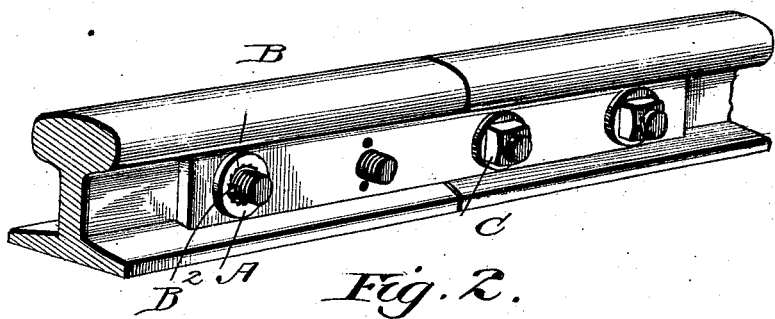
Figure 2:
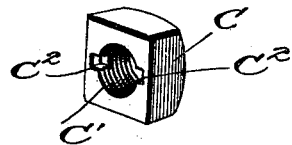
Figure 3:
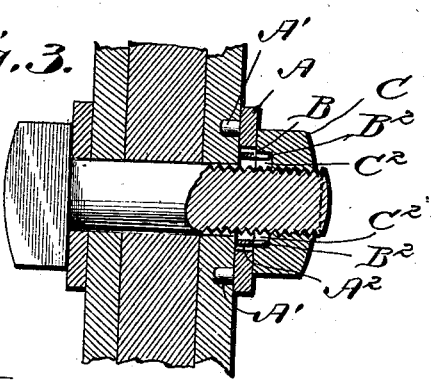
Figure 4:
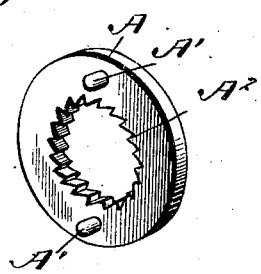
Figure 5:
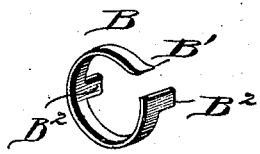

In the drawings forming part of this specification, Figure 1 is a perspective view showing a bolt passed through a railroad-rail and surrounded by the washer and locking-ring, the nut being removed. Fig. 2 is an inverted perspective view of the nut. Fig. 3 is a detail sectional view showing the position of the parts when in their locked position. Fig. 4 is a detail perspective view of a washer, and Fig. 5 is a detail perspective view of the ring.

In carrying out my invention I employ a washer A, which is provided with one or more studs A' upon the under face thereof, adapted to engage recesses produced in the face of the fish-plate. The opening of this washer A is made somewhat larger than the diameter of the bolt and has a series of ratchet serrations or teeth $A^2$ produced thereon, and arranged within the washer is a split steel ring B, one end being shaped to engage the ratchet-teeth in the washer, so that the said ring can be moved around within the washer in one direction, but will be prevented from moving in the reverse direction by the engagement of the pawl end B' with the ratchet-teeth of the washer. This ring B is also provided with ears or lugs $B^2$, extending beyond the face of the washer A, said lugs or ears being adapted to rest in recesses $C^2$, produced in the inner face of the nut C upon the opposite sides of the central threaded opening C'. When the nut is turned down sufficiently to bring the lugs or extensions $B^2$ into the recess $C^2$, the ring will then be caused to turn within the washer as the nut is screwed down tight upon the bolt, the pawl end B' of the ring slipping over the ratchet-teeth. During this operation the washer is of course held fixed, and likewise the bolt, so that the nut can be screwed tight, and when once secured it will be impossible for the said nut to become loose by being turned backwardly, inasmuch as the said nut is held in place by means of the ring and the ring is prevented from moving by the engagement of the pawl end thereof with the ratchet-teeth of the washer. Whenever it is desired to remove the nut, the bolt should be turned from the reverse end.

It will thus be seen that I provide an exceedingly simple and efficient construction of nut-lock which will securely hold the nut upon the bolt, and it will also be noted that these objects are obtained by means of very few parts, which can be cheaply and easily constructed and readily arranged in their operative positions.

Having thus fully described my invention, what I claim as new, and desire to secure by Letters Patent of the United States, is—

1. In a nut-lock, the combination with a washer, having ratchet-teeth arranged within the opening, a locking-ring adapted to engage the teeth of the washer and provided with means for engaging the nut, substantially as described.

2. In a nut-lock, the combination with a washer having ratchet-teeth produced in the central opening, of the split ring arranged within the washer and adapted to engage the ratchet-teeth, and having one or more lugs or extensions adapted to engage a recess in the nut, substantially as described.

3. In a nut-lock, the combination with the washer having the internal ratchet-teeth, of a split ring having a pawl at one end and carrying one or more lugs or ears extending beyond the washer, said split ring being arranged within the ratchet-faced opening of the washer, and the nut having one or more recesses adapted to receive the lug or lugs carried by the split ring, substantially as and for the purpose described.

WALTON CHAPPEL BERRY.

Witnesses:
W. H. ENNIS,
R. M. MOSS.